United States Patent [19]

Sawyer

[11] Patent Number: 5,097,586
[45] Date of Patent: Mar. 24, 1992

[54] SPRAY-FORMING METHOD OF FORMING METAL SHEET

[75] Inventor: Thomas F. Sawyer, Charlton, N.Y.

[73] Assignee: General Electric Company, Schenectady, N.Y.

[21] Appl. No.: 627,480

[22] Filed: Dec. 14, 1990

[51] Int. Cl.$^5$ ............................................. B21B 1/46
[52] U.S. Cl. ..................................... 29/527.6; 164/46; 219/68; 219/69.17; 427/37; 427/138
[58] Field of Search .............. 427/421, 422, 423, 34, 427/37, 133; 29/527.6; 164/46; 219/68, 69.1, 69.12, 69.17

[56] References Cited

U.S. PATENT DOCUMENTS

| | | | |
|---|---|---|---|
| 3,895,207 | 7/1975 | Heywang | 219/69.17 X |
| 3,895,208 | 7/1975 | Kraus | 219/68 |
| 4,547,391 | 10/1985 | Jenkins | 427/37 |
| 4,777,995 | 10/1988 | Reichelt et al. | 164/46 |
| 4,886,202 | 12/1989 | Ammon | 427/37 X |
| 4,916,278 | 9/1990 | Rudd et al. | 219/68 X |
| 4,978,557 | 12/1990 | Drake et al. | 427/133 X |

*Primary Examiner*—Carl J. Arbes
*Attorney, Agent, or Firm*—James E. McGinness; James C. Davis, Jr.; James Magee, Jr.

[57] ABSTRACT

A metal composition is formed into a sheet by the method comprising; spray forming the metal composition to form a cylindrical deposit, and wire electric discharge machining the cylindrical deposit in a preselected spiral path parallel to the axis of the cylindrical deposit to form the sheet.

6 Claims, 1 Drawing Sheet

SPRAY-FORMING METHOD OF FORMING METAL SHEET

This invention is related to a method of forming metals into sheet, and in particular forming sheet from high temperature superalloys that are difficult to form into sheet by traditional thermomechanical processing. As used herein, the term "sheet" means a body having a small thickness dimension in comparison to its length and width dimensions.

BACKGROUND OF THE INVENTION

Engineering metals such as aluminum alloys, titanium alloys, steels, and superalloys, are processed into sheet by melting the desired composition, casting the melt into ingots, hot rolling the ingots to slabs, and subsequently rolling the slabs into sheet form. Intermediate and final annealing operations can be performed on the rolled sheet to recrystallize the microstructure or obtain various properties such as improved ductility. In rolling, a squeezing type of deformation is accomplished by using two work rolls rotating in opposite directions. The principal advantage of rolling lies in its ability to produce desired shapes from relatively large pieces of metals at very high speeds in a somewhat continuous manner. Slabs are generally rolled at temperatures above the recrystallization temperature of the metal, or hot forming range, where large reductions in thickness are possible with moderate forming pressures. Smaller reductions can be made by cold rolling, forming below the temperature the metal will recrystallize, to maintain close thickness tolerances.

The multiple deformation forming processes in sheet rolling can produce a preferred crystal orientation or texture in the sheet. Crystals in certain orientations are more resistant to deformation than are other crystals. These deformation resistant oriented crystals tend to rotate during deformation thereby producing a preferred orientation. During recrystallization, preferred orientations result from the preferential nucleation and growth of grains of certain orientations.

Superalloys are difficult to deform and easy to crack during deformation. Since the superalloys were designed to resist deformation at high temperatures, it is not surprising that they are very difficult to hot work; the alloys having limited ductility and high flow stress. Furthermore, additional alloying elements which improved service qualities in the superalloy, usually decrease the ability to work or deform the alloy into a desired form. As a result, primary or slab rolling of superalloy sheet is usually performed at temperatures near the melting point of the alloy on rugged, powerful mills built to withstand the high stresses encountered in the working of superalloys, and fast handling is mandatory to minimize edge cracking. The superalloys have narrow working temperature ranges, and are often rolled in packs or layers, that are sometimes encased in a steel envelope, to minimize heat loss to the relatively cold rolls upon deformation. The narrow working temperature range makes the rolling labor intensive, and many intermediate reheating steps are required. Some of the superalloys that are commercially available in a sheet form are Hastelloy alloy X, IN-600, IN-718, IN-625, Rene, 41, and Waspaloy.

A combination of properties such as strength, formability, and weldability are desired in superalloy sheet, and the desired combination of properties dictate many aspects of the extensive thermomechanical processing required to form the sheet. However, equipment limitations may prevent performance of the required thermomechanical processing so that some desired properties may not be obtainable in sheets formed from some of the superalloy compositions. Because some sets of properties have not been attainable in cast alloy materials, resort is sometimes had to the preparation of parts by powder metallurgy techniques. However, one of the limitations which attends the use of powder metallurgy techniques in preparing moving parts for jet engines is that of the purity of the powder. If the powder contains impurities such as a speck of ceramic or oxide, the place where that speck occurs in the moving part becomes a latent weak spot where a crack may initiate. Some of the superalloy compositions that are prepared by powder metallurgy techniques are shown below in Table I.

TABLE 1

| Superalloy Compositions In Weight Percent | | | | |
|---|---|---|---|---|
| | Astroloy | Rene95 | Unitemp AF2-1DA | IN100 |
| Ni | Bal. | Bal. | Bal. | Bal. |
| Cr | 15 | 13 | 12 | 10 |
| Co | 17 | 8 | 10 | 15 |
| Mo | 5.25 | 3.5 | 2.75 | 3 |
| W | | 3.5 | 6.5 | |
| Nb | | 3.5 | 4.6 | 5.5 |
| Ta | | | 1.5 | |
| Al | 4 | 3.5 | 4.6 | 5.5 |
| Ti | 3.5 | 2.5 | 2.8 | 4.7 |
| C | 0.06 | 0.06 | 0.04 | 0.05 |
| B | 0.03 | 0.01 | 0.02 | 0.014 |
| Zr | | 0.05 | | 0.06 |
| V | | | | 0.09 |

It is an object of this invention to provide a simplified method of forming metal into sheet.

It is another object of this invention to provide a method for forming sheets from metal compositions that are difficult to deform.

It is another object of this invention to provide a method for forming sheet having a substantially isotropic and fine crystal or grain structure.

BRIEF DESCRIPTION OF THE INVENTION

The method of this invention provides metal sheet by a simplified process that does not require the multiple thermomechanical processing steps of prior methods. A metal composition, for example a superalloy composition, is spray formed on a cylindrical mandrel to form a cylindrical deposit. The deposit is wire electric discharge machined in a preselected spiral path parallel to the axis of the cylindrical deposit to form the sheet. Preferably, the mandrel is first removed from the deposit, and the spiral path is machined proceeding from the inside diameter to the outer diameter of the deposit. Post cold rolling or annealing treatments can be performed on the sheet to obtain a desired surface finish or properties in the sheet.

DETAILED DESCRIPTION OF THE INVENTION

Sheet formed by the method of this invention has a uniform crystalline structure free of macrosegregation, and has a very fine grain size of random or isotropic orientation. Highly alloyed metal compositions that are difficult to ingot cast due to macrosegregation of the alloying elements can be formed into sheet by the method of this invention. Because extensive deformation of the metal in multiple rolling steps is not required in the method, the ductility and high temperature strength of the metal are not limitations to forming the sheet or to forming a desired thickness of the sheet.

Although the method of this invention can be practiced on any of the engineering metals such as steel, stainless steel, or iron, it is especially useful as a method for forming sheet from the very high strength and difficult to deform metals such as the superalloys or titanium alloys. Therefore, the method of this invention is advantageously performed on the superalloy composition described above, and especially those in Table 1, or the tri-nickel aluminide base superalloys, for example, in U.S. Pat. Nos. 4,613,386, 4,606,888, 4,609,528, 4,650,519, 4,661,156, 4,676,829, or the titanium alloys, including the intermetallic compounds of the titanium aluminides, for example, those disclosed in U.S. Pat. Nos. 4,253,873, 4,087,292, 4,292,077, 2,880,087, 3,411,901, 4,716,020, 4,770,726, 3,203,794, 4,294,615, and in pending application Ser. No. 07/325,738. The above list of metal compositions is not meant to be a complete list, but is merely an example of the metal compositions that can be formed into sheet by the method of this invention.

In the method of this invention, a cylindrical deposit is formed by a spray forming process, such as plasma spraying of powders, or preferably, by spraying gas atomized molten metal. Some of the methods for plasma spraying metal powders are described, for example, in U.S. Pat. Nos. 4,689,468 and 4,838,337, both incorporated herein by reference. Spraying of gas atomized molten metal is described in "The Spray Forming of Superalloys", H. C. Fiedler et al., Journal of Metals, Vol. 39, No.8, August, 1987, pp. 28-33, and U.S. Pat. No. 3,826,301, both incorporated herein by reference. Spraying of gas atomized molten metal is preferred because of the lower level of interstitial atoms such as nitrogen or oxygen, and the greater spray forming capacity that are found with the use of this process.

Figure 1:
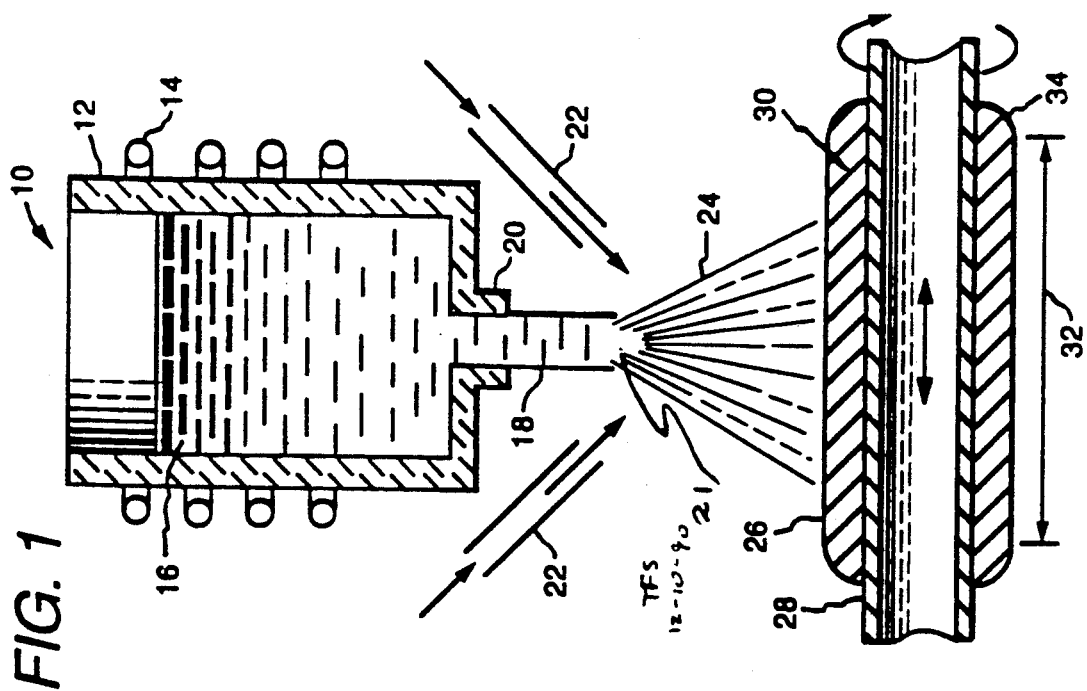

A preferred method of spraying gas atomized molten metal is shown in FIG. 1. Referring to FIG. 1, a crucible 10 is provided as a molten metal dispensing crucible. The crucible is used to hold a body of liquid metal and to dispense it as a stream to an atomization zone located beneath the crucible. The crucible is preferably a segmented crucible made up of a number of water cooled metal segments which fit around and form the walls of the crucible. Each segment is electrically isolated from its adjoining segments and each segment is individually water cooled. A benefit of the water cooling is to permit a skull of the metal of the melt to form on the inside of the crucible and contain the molten metal. The skull avoids the need for a ceramic crucible to contain the melt so that introduction of ceramic particles into the melt from spalling or cracking of the ceramic crucible is minimized. The melt is kept at its operating temperature by the action of a set of induction coils 14. The segmented character of such a crucible permits the electric flux to penetrate the crucible 12 to act on the liquid metal content of the crucible 16. However, crucible can be formed as a single piece from a high temperature ceramic compatible with the melt composition, for example, the superalloys can be melted in alumina, zirconia or magnesia crucibles. It has recently been found that titanium can be melted in a calcia crucible, "Melting and Precision Casting of Pure Titanium Using Calcia," T. Degawa, et al., Proceedings of the Sixth World Conference on Titanium, Societe Francaise de Metallurgie, France, 1988, pp. 707-713.

A stream 18 of liquid metal pours from the bottom spout 20 of crucible 10 passing into an atomization zone 21 where it is acted on by a jet or jets of atomizing gas emitted from nozzle 22, the gas being delivered to the nozzle 22 from a source which is not shown. Suitable atomizing gases are inert gases such as argon or nitrogen.

The result of the atomization of the liquid stream 18 by the atomizing gas in zone 21 is the production of a cone 24 of droplets of liquid metal. The formation of such a cone is consistent with the practice of the art of spray forming. The droplets impact on a receiving surface 26 which is shown in the form of an annular band formed on the hollow mandrel 28 to form a cylindrical deposit 30. The mandrel 28 is given both a rotary and a reciprocating motion, indicated by the arrows, by drive means which are not shown. Such motion causes a uniform layer to form on the receiving surface 26. The rotary and reciprocating motion of the mandrel are controlled to provide a cylindrical deposit 30 having a desired width 32 and cross-section or wall thickness.

Preferably, mandrel 28 is a cylinder having a surface in the form of a screen having screen openings which permit at least partial passage of metal spray droplets or liquid particles therethrough. Such mandrels are described in copending application Ser. No. 07/328,212, filed Mar. 24, 1989, incorporated herein by reference.

After spraying is complete, mandrel 28 is removed from cylindrical deposit 30, for example, by wire electric discharge machining. Preferably, uneven end portions 34 are also removed in a like manner from cylindrical deposit 30 to define the desired width 32. At the interface between the mandrel 28 and deposit 30, and in the uneven end portions of the deposit there is generally formed a higher amount of porosity, voids, or other gas atomized molten metal spray forming defects as compared to the central portion of deposit 30 within width 32. Preferably, in removing mandrel 30 and uneven end portions 34, the excess porosity, voids, or other spray formed defects are removed. Electrical discharge wire machining is a process that is similar in configuration to band sawing, except with electric discharge wire machining, the saw is a wire electrode 36 of small diameter. Cutting occurs based upon the erosion effect of electric sparks occurring between two electrodes, the electrodes being the wire and the cylindrical deposit. Electric discharge wire machining is described, for example, in "Tool and Manufacturing Engineers Handbook", Fourth Edition, Vol. 1, 1983, pp. 14-42 to 14-61, incorporated herein by reference.

Figure 2:
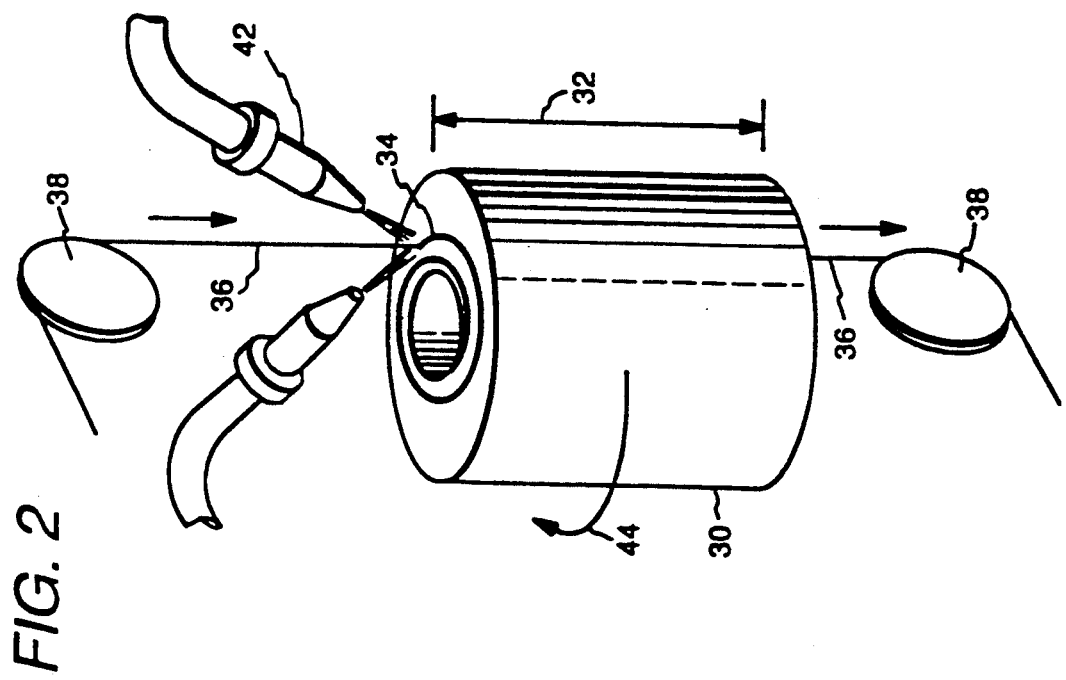

Referring to FIG. 2, cylindrical deposit 30 is electric discharge wire cut, or machined, in a spiral path 34 that is parallel to the cylinder axis. An electrical discharge wire machine, not shown, has means for feeding the cutting wire, movement of the workpiece, and a power supply to provide the spark energy for the cut. An X-Y translation table, not shown, is mounted on the machine base for holding and positioning the deposit 30. Movement of the X-Y translation table is controlled by a programmed computer. A suitable wire electric discharge machine is the Mitsubishi DWC 110, Mitsubishi Electric Corporation, Japan.

Material is removed by spark erosion as a wire electrode 36 passes through cylindrical deposit 30. The wire electrode 36 moves vertically over sapphire or diamond wire guide spools 38, one above and one below the cylindrical deposit 30. A pulsating direct current sufficient for spark erosion cutting is supplied to wire electrode 36 operatively connected to a power supply, not shown. Electrode wire 36 is used once and then discarded because the wire becomes misshapened after one pass through the cylindrical deposit. Nozzles 42 provide a steady stream of deionized water or other fluid to cool the cylindrical deposit and electrode wire, and to flush the cut area.

The cylindrical deposit 30 is mounted on the X-Y translation table for movement in the plane normal to the electrode wire 36. A programmed computer controls the X-Y translation table so that the cylindrical deposit 30, is rotated in the direction of arrow 44, and fed into electrode wire 36 in the spiral cutting path 34. Spiral path 34 is controlled so that there is a preselected spacing between each spiral to provide a desired sheet thickness. For example, spiral path 34 has the same spacing between spirals through the entire wall thickness of the cylindrical deposit 30 to form a sheet having the same thickness, or the spacing between spirals can be increased or decreased to form preselected lengths of various sheet thicknesses. The cross-section or wall thickness of deposit 30 limits the number of spirals that can be cut from the deposit, and determines the linear feet of sheet that can be cut from deposit 30.

After wire electric discharge machining the sheet will have approximately the curvature of the cylindrical deposit. If a flat sheet is required, cold rolling, or cold rolling combined with annealing steps can be performed to flatten the sheet and achieve other desired properties such as increased strength or ductility in the sheet. The electric discharge wire machining can also leave a surface oxide on the sheet which can be removed by a reducing atmosphere in the annealing step, or by grit blasting or shot peening of the surface. Such grit blasting or shot peening can also be performed to improve fatigue properties of the sheet.

EXAMPLE 1

A charge of about 20 kilograms of a nickel based superalloy comprised of in weight percent; about 18% cobalt, 16% chromium, 5% molybdenum, 5% tungsten, 2.5% aluminum, 3% titanium, 3% niobium, 0.05% zirconium, 0.01% boron, 0.075% carbon, and the balance nickel was melted in a magnesia crucible. The molten metal was poured from a nozzle in the bottom of the crucible having a 6 millimeter bore, and gas atomized molten metal spray formed onto a cylindrical mandrel approximately 17.5 centimeters in diameter. Nitrogen was used as the atomizing gas impinging on the molten metal stream pouring from the nozzle to form the molten metal spray. The spray formed cylindrical deposit had a width of about 15 centimeters and a cross-section, or wall thickness, of about 3 centimeters. A center portion of about 4.7 centimeters was removed from the central portion of the deposit width.

The center portion was then positioned on the computer controlled X-Y translation table of a wire electric discharge machine so that the cylinder axis was parallel to the cutting electrode wire in the machine. A 0.020 inch brass wire was used as the electrode wire, with cutting proceeding from the inside diameter to the outside diameter of the cylindrical deposit. The mandrel was removed from the inside diameter of the center portion, and the computer was programmed so that a spiral path was cut into the cylindrical deposit with a spacing of about 0.877 millimeters between each spiral. Cutting proceeded at a rate of about 3.3 linear centimeters per hour and was terminated after two revolutions were cut from the cylindrical deposit to form a sheet having a length of about 122 centimeters and width of about 4.7 centimeters. If cutting had continued through the entire thickness of the central portion, the length would have measured to about 853 centimeters. The resulting sheet measured about 0.965 millimeters in thickness uniformly across the width of the sheet.

The grain size of the sheet was determined by standard metallographic techniques according to ASTM E 112, Annual Book of ASTM Standards, Philadelphia, Pa. A sample of the sheet was viewed in the thickness dimension at the center and near each edge of the sheet width, and found to have a substantially equiaxed uniform size 8 grain size across the width of the sheet.

What is claimed is:

1. A method for forming a metal into a sheet, comprising:
   spray forming the metal on a cylindrical mandrel to form a cylindrical deposit; and
   wire electric discharge cutting tne deposit in a preselected spiral path parallel to the axis of the cylindrical deposit to form the sheet.

2. The method of claim 1 further comprising the step of removing the mandrel from the deposit.

3. The method of claim 2 where the deposit has a first end and a second end defining a width of the cylindrical deposit therebetween, and the first end and second end portions are removed from the deposit to form a preselected cylinder width.

4. The method of claim 3 wherein the spiral path is selected so that the spacing between spirals forms a desired sheet thickness.

5. The method of claim 1 wherein the metal is a superalloy.

6. The method of claim 1 wherein the metal is a titanium alloy.

* * * * *